2,993,781
METHOD OF MAKING STEEL
Walter L. Kerlie, Pittsburgh, Pa., assignor to United States Steel Corporation, a corporation of New Jersey
No Drawing. Filed May 27, 1959, Ser. No. 816,071
3 Claims. (Cl. 75—52)

This invention relates to a method of making steel and more particularly to making steel in a regenerative type furnace, such as a basic open hearth furnace, when using oxygen lancing and both hot and cold charges. In the operation of such furnaces it is common to provide a first charge consisting of cold scrap, iron ore, limestone and/or lime. Molten pig iron is added to the charge after the scrap has been melted or brought to incipient melting. It is usually desirable to use as much scrap as possible, and this common method of operation limits the amount of scrap that can be used and also requires a long charge-to-melt time.

It is therefore an object of my invention to provide a method of making steel in a regenerative type furnace which permits a greater proportion of scrap than usual to be used.

Another object is to provide such a method which shortens the charge-to-melt time and reduces the amount of fuel required.

Still another object is to provide such a method which permits better control of the rate of carbon removal.

A further object is to provide such a method which improves the quality of the steel.

These and other objects will be more apparent after referring to the following specification.

In carrying out my method a regenerative type furnace, fired with oil or other fuel, is charged with a predetermined quantity of scrap which is preferably more than 30% of the total metallic charge. As this time no appreciable amount of iron ore or lime in any form is added. As used herein the term scrap does not exclude the use of cold pig iron or similar materials. The scrap charge is heated rapidly with the heat being provided in the usual manner by means of fuel burners and air through the regenerators. The temperature $T_{sc}$ to which the scrap is heated is calculated from the equation $$\frac{T_{sc}W_{sc} + T_{hm}W_{hm}}{W_{ch}} = 1535 - 77\left[\frac{C_{sc}W_{sc} + C_{hm}W_{hm}}{W_{ch}}\right]$$

wherein T, W, and C refer to temperature in degrees C., weight in tons, and carbon content in percent, respectively, and the subscripts *sc*, *hm*, and *ch* refer to the scrap, hot metal, and total metal charge (scrap plus hot metal), respectively. This calculation cannot be made accurately if limestone or ore is added in the original charge. When temperature $T_{sc}$ is reached a second charge consisting of molten pig iron, lime, and/or limestone is added. It is preferred that the hot metal be added within 15 minutes after the lime addition. The temperature $T_{sc}$ of the scrap is below its liquidus temperature, but is sufficiently high that when mixed with the secondary charge the resulting mixture will have an average temperature higher than the liquidus temperature of the mixture. After the hot metal is charged the fuel is cut off, the regenerator air rate reduced to a low value (about 25% of the value during firing), and the mixture blown with oxygen. During the refining period of oxygen is preferably fed to the furnace at a constant rate with the fuel remaining off. During the heating of the scrap a certain amount of oxidation of the scrap by the preheated air results, but such oxidation is beneficial, particularly toward the end of the scrap-heating period, because it generates heat within the scrap. Also the hot iron oxide so formed assists in the rapid development of a fluid slag during the oxygen-blowing or refining period and speeds up the removal of phosphorus.

Since the bath becomes completely melted and homogeneous within a short period after the oxygen is turned on, it is possible to obtain a representative bath sample for chemical analysis very early in the refining period. This makes it possible to closely control the subsequent refining with oxygen. By maintaining the oxygen input at a constant value the rate of carbon removal remains constant. Therefore it is possible to adjust the practice so that the time required to reach the desired carbon content can be predicted from a knowledge of the initial carbon content in the molten bath and the rate of oxygen input. In practice this must be done after a few minutes of oxygen blowing which removes the silicon and reduces the manganese to a relatively low constant value. After the oxygen is adjusted to the most suitable constant supply rate, the bath is sampled for carbon analysis and, about twenty minutes later, the bath is sampled again for carbon analysis. From these analyses and the times of sampling, the time to tap the heat at the desired carbon content can be predicted very simply, since a plot of the carbon content against time, for a constant oxygen rate, is a straight line. If necessary, carbon samples can, of course, be taken for check purposes before tapping the heat. During the refining period the carbon monoxide escaping from the bath will burn and produce additional heat for carrying on the process. Since the fuel is shut off during refining and a flow of preheated air is used to maintain a fully oxidizing atmosphere, the $H_2O$ content of the furnace atmosphere will be reduced to a very low value and the sulfur content of the bath will also be reduced. Thus, the method produces a steel having a low sulfur and hydrogen content.

In a 100-ton furnace using 60 tons of cold scrap and 40 tons of hot metal, the steelmaking procedure would be as follows:

Cold scrap of approximately known composition will be charged at a rate commensurate with the maximum rate of heating with the scrap being spread mainly over the central hearth area. The temperature of the hot metal of known composition will be measured when the scrap is considered to be approaching the desired temperature ($T_{sc}$). The average scrap temperature can be measured by inserting a suitably designed thermocouple in several locations or by taking optical measurements on several locations with the fuel momentarily shut off.

Assuming the following conditions relating to cold scrap and hot metal:

|  | Temp., °C. | Composition, Percent | | | |
|---|---|---|---|---|---|
|  |  | C | Si | Mn | P |
| Cold scrap | 15 | 0.10 | tr | 0.30 | 0.03 |
| Hot metal | 1,345 | 4.20 | 1.20 | 1.50 | 0.30 | the temperature ($T_{sc}$) to which the scrap should be heated is determined by substituting in the equation set forth above as follows:

$$\frac{T_{sc} \times 60 + 1345 \times 40}{100} = 1535 - 77\left[\frac{0.10 \times 60 + 4.20 \times 40}{100}\right]$$

Solving this equation results in $T_{sc} = 1440°$ C.

When the scrap reaches 1440° C., the hot metal will be charged and the operations carried out as set forth above.

The weight of lime to be charged at approximately the same time as the hot metal may be calculated in a standard manner from the composition of the charge materials, the specified composition at tap of the finished steel and the previously established refractory erosion factor of the furnace.

I claim:

1. The method of making steel in a regenerative type furnace which comprises charging the furnace with a primary charge consisting essentially of scrap, heating the scrap to a temperature below its liquidus temperature, adding a second charge of molten pig iron and lime, the temperature to which the scrap is heated prior to adding the second charge being such that when mixed with the molten pig iron the resultant mixture will have an average temperature at least equal to the liquidus temperature of the mixture, and feeding oxygen-bearing gas into the bath at a controlled rate after the second charge has been added.

2. The method of making steel in a regenerative type furnace which comprises charging the furnace with a primary charge consisting essentially of scrap, heating the scrap to a temperature below its liquidus temperature, adding a second charge of molten pig iron and lime, the temperature to which the scrap is heated prior to adding the second charge being such that when mixed with the molten pig iron the resultant mixture will have an average temperature at least equal to the liquidus temperature of the mixture, feeding oxygen-bearing gas into the bath at a controlled rate after the second charge has been added, shutting off fuel to the furnace and greatly decreasing the flow of air from the regenerators during the introduction of oxygen-bearing gas into the bath, and tapping the furnace after the steel has reached the desired composition.

3. The method of making steel in a regenerative type furnace according to claim 1 in which the addition of the molten pig iron starts within 15 minutes after the lime additions.

References Cited in the file of this patent

UNITED STATES PATENTS 2,878,115     Shane et al. _____ Mar. 17, 1959